United States Patent
Yun et al.

(10) Patent No.: US 11,797,688 B2
(45) Date of Patent: Oct. 24, 2023

(54) APPARATUS AND METHOD FOR DETERMINING VULNERABILITY OF DEEP LEARNING MODEL

(71) Applicant: INDUSTRY ACADEMY COOPERATION FOUNDATION OF SEJONG UNIVERSITY, Seoul (KR)

(72) Inventors: Joo Beom Yun, Seoul (KR); Ji Hyeon Yu, Seoul (KR); Hyun Jun Mun, Seoul (KR)

(73) Assignee: INDUSTRY ACADEMY COOPERATION FOUNDATION OF SEJONG UNIVERSITY, Seoul (KR)

( * ) Notice: Subject to any disclaimer, the term of this patent is extended or adjusted under 35 U.S.C. 154(b) by 406 days.

(21) Appl. No.: 17/330,581

(22) Filed: May 26, 2021

(65) Prior Publication Data
US 2022/0019675 A1    Jan. 20, 2022

(30) Foreign Application Priority Data

Jul. 15, 2020   (KR) .......................... 10-2020-0087811

(51) Int. Cl.
G06F 21/57    (2013.01)
G06N 3/08    (2023.01)
G06F 18/22    (2023.01)

(52) U.S. Cl.
CPC ............ G06F 21/577 (2013.01); G06F 18/22 (2023.01); G06N 3/08 (2013.01); *G06F 2221/033* (2013.01)

(58) Field of Classification Search
CPC .. G06F 21/577; G06F 18/22; G06F 2221/033; G06N 3/08; G06N 3/04; G06N 3/0895; G06N 3/09; G06N 3/091; G06N 3/092; G06N 3/094; G06N 3/096; G06N 3/098; G06N 3/0985; G06V 10/776
See application file for complete search history.

(56) References Cited

U.S. PATENT DOCUMENTS

| | | | |
|---|---|---|---|
| 2020/0117991 A1* | 4/2020 | Suzuki | G06N 3/045 |
| 2020/0293892 A1* | 9/2020 | Zhou | G06N 3/08 |
| 2020/0356863 A1* | 11/2020 | Saha | G06V 10/774 |
| 2021/0027107 A1* | 1/2021 | Pekelny | G06N 3/045 |
| 2021/0160522 A1* | 5/2021 | Lee | H04N 19/184 |
| 2021/0383216 A1* | 12/2021 | Shinkawa | G06N 3/04 |
| 2022/0092336 A1* | 3/2022 | Yu | G06F 21/36 |

OTHER PUBLICATIONS

Harel-Canada, Fabrice Yohann, "Is Neuron Coverage a Meaningful Measure for Testing Deep Neural Networks?" UCLA, Published 2019.*

(Continued)

*Primary Examiner* — J. Brant Murphy
(74) *Attorney, Agent, or Firm* — The PL Law Group, PLLC (57) ABSTRACT

An apparatus for determining a vulnerability of a deep learning model according to an embodiment includes a converter configured to generate an input image for the deep learning model by transforming an original image selected from an image dataset, a measurer configured to measure neuron coverage of the deep learning model by inputting the input image into the deep learning model, and an inspector configured to detect, based on a prediction result of the deep learning model for a class of the input image and a class of the original image, an error in the prediction result.

12 Claims, 4 Drawing Sheets

(56) References Cited

OTHER PUBLICATIONS

Office action dated Sep. 1, 2020 from Korean Patent Office in a counterpart Korean Patent Application No. 10-2020-0087811 (all the cited references are listed in this IDS.) (English translation is also submitted herewith.).
Jinhan Kim et al., "Guiding Deep Learning System Testing Using Surprise Adequacy", 2019 IEEE/ACM 41st International Conference on Software Engineering(ICSE), Aug. 25, 2018, pp. 1039-1049.
Lei Ma et al., "DeepGauge: Multi-Granularity Testing Criteria for Deep Learning Systems", In Proceedings of the 2018 33rd ACM/IEEE International Conference on Automated Software Engineering (ASE '18), Sep. 3-7, 2018, Montpellier, France.

* cited by examiner

APPARATUS AND METHOD FOR DETERMINING VULNERABILITY OF DEEP LEARNING MODEL

CROSS-REFERENCE TO RELATED APPLICATION

This application claims the benefit under 35 USC § 119(a) of Korean Patent Application No. 10-2020-0087811, filed on Jul. 15, 2020, in the Korean Intellectual Property Office, the entire disclosure of which is incorporated herein by reference for all purposes.

BACKGROUND

1. Field

The disclosed embodiments related to a technique for determining a vulnerability of a deep learning model.

2. Description of Related Art

As the development of artificial intelligence-related fields accelerates and diversifies, security issues in artificial intelligence are becoming important. In particular, in a deep learning system which is one of the major fields of artificial intelligence, research is being attempted to cope with this. However, as in traditional software, there are various vulnerabilities in a deep learning model.

The vulnerability in the deep learning model refers to incorrect configuration of a loss function, optimizer, and activation function for the deep learning model, or matters that, by attacking or altering input data, make the model incapacitated or cause the model to process and classify data in a manner that is not identical to human judgment. In recent years, research to apply a fuzzing method, which is a testing technique that has succeeded in traditional software, to the deep learning system has been attempted, but since it is still in the early stages of research, the research has a problem that the proof of the efficiency of single error detection structure and input value conversion technique, and the accuracy of model coverage measurement is insufficient.

SUMMARY

The disclosed embodiments are intended to provide an apparatus and method for determining a vulnerability of a deep learning model.

According to an embodiment, there is provided an apparatus for determining a vulnerability of a deep learning model including, a converter configured to generate an input image for the deep learning model by transforming an original image selected from an image dataset, a measurer configured to measure neuron coverage of the deep learning model by inputting the input image into the deep learning model, and an inspector configured to detect, based on a prediction result of the deep learning model for a class of the input image and a class of the original image, an error in the prediction result.

The converter may be further configured to generate the input image by applying at least one of one or more preset conversion techniques to the original image in order to generate an adversarial example that maintains semantic preservation of the original image.

The measurer may be further configured to measure the neuron coverage based on an output value for the input image of each of a plurality of neurons included in the deep learning model for the input image.

The measurer may be further configured to measure the neuron coverage based on a sum of output values for the input image of each of the plurality of neurons.

The measurer may be further configured to measure the neuron coverage based on a number of neurons whose output value for the input image exceeds a preset threshold among the plurality of neurons.

The inspector may be further configured to detect the error based on whether or not the class of the original image matches the prediction result.

According to another embodiment, there is provided a method for determining a vulnerability of a deep learning model including, generating an input image for the deep learning model by transforming an original image selected from an image dataset, measuring neuron coverage of the deep learning model by inputting the input image into the deep learning model, and detecting, based on a prediction result of the deep learning model for a class of the input image and a class of the original image, an error in the prediction result.

The generating of the input image may comprise generating the input image by applying at least one of one or more preset conversion techniques to the original image in order to generate an adversarial example that maintains semantic preservation of the original image.

The measuring of the neuron coverage may comprise measuring the neuron coverage based on an output value for the input image of each of a plurality of neurons included in the deep learning model for the input image.

The measuring of the neuron coverage may comprise measuring the neuron coverage based on a sum of output values for the input image of each of the plurality of neurons.

The measuring of the neuron coverage may comprise measuring the neuron coverage based on a number of neurons whose output value for the input image exceeds a preset threshold among the plurality of neurons.

The detecting the error may comprise detecting the error based on whether or not the class of the original image matches the prediction result.

According to the disclosed embodiments, by automatically detecting an error in the deep learning model, there is an advantage in that the time required to detect the vulnerability of the deep learning model can be saved, the waste of manpower can be eliminated because there is no room for human judgment to intervene, and further the accuracy of the inspection can be increased, and thus a reliable deep learning model can be obtained accurately and quickly.

DETAILED DESCRIPTION

Hereinafter, a specific embodiment will be described with reference to the drawings. The following detailed description is provided to aid in a comprehensive understanding of the methods, apparatus and/or systems described herein. However, this is only an example, and the disclosed embodiments are not limited thereto.

In describing the embodiments, when it is determined that a detailed description of related known technologies related to the present invention may unnecessarily obscure the subject matter of the disclosed embodiments, a detailed description thereof will be omitted. In addition, terms to be described later are terms defined in consideration of functions in the present invention, which may vary according to the intention or custom of users or operators. Therefore, the definition should be made based on the contents throughout this specification. The terms used in the detailed description are only for describing embodiments, and should not be limiting. Unless explicitly used otherwise, expressions in the singular form include the meaning of the plural form. In this description, expressions such as "comprising" or "including" are intended to refer to certain features, numbers, steps, actions, elements, some or combination thereof, and it is not to be construed to exclude the presence or possibility of one or more other features, numbers, steps, actions, elements, parts or combinations thereof, other than those described.

Figure 1:
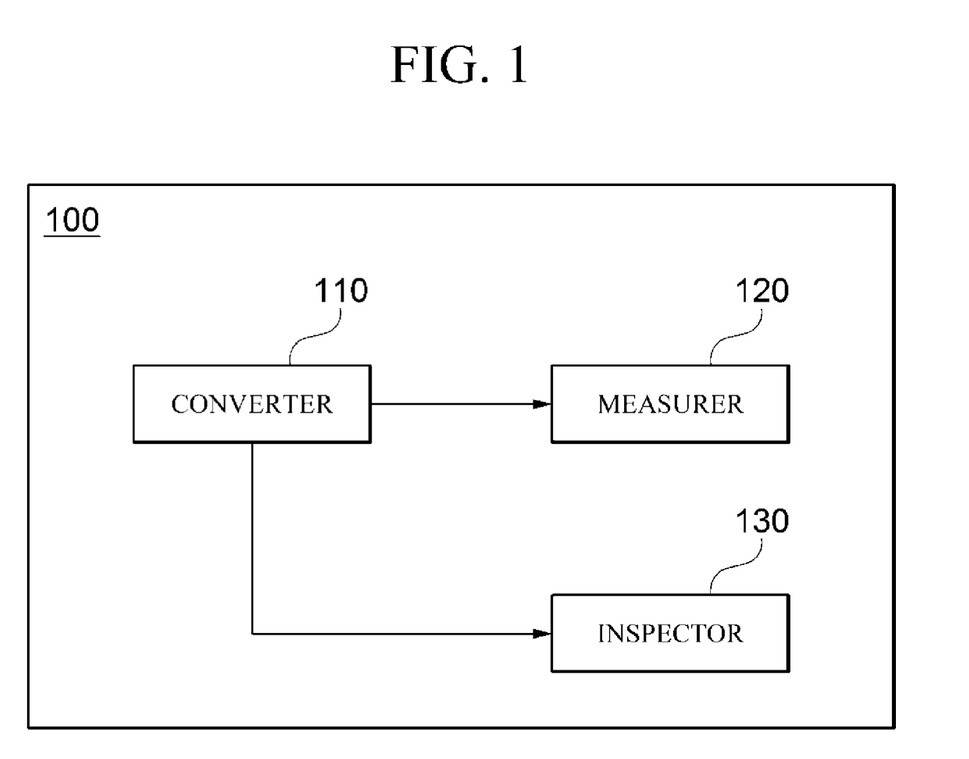
FIG. 1 is a block diagram of an apparatus for determining a vulnerability according to an embodiment.

FIG. 1 is a block diagram of an apparatus for determining a vulnerability according to an embodiment.

Referring to FIG. 1, an apparatus 100 for determining a vulnerability illustrated includes a converter 110, a measurer 120, and an inspector 130.

In the illustrated embodiment, respective configurations may have different functions and capabilities in addition to those described below, and may include additional configurations in addition to those described below.

In addition, in one embodiment, the converter 110, the measurer 120, and the inspector 130 may be implemented using one or more physically separated devices, or may be implemented by one or more processors or a combination of one or more processors and software, and unlike the illustrated example, may not be clearly distinguished in a specific operation.

The converter 110 generates an input image for a deep learning model by transforming an original image selected from an image dataset.

According to an embodiment, the converter 110 may store the original image selected from the image dataset in a seed queue, and select an image to be an input image of the deep learning model from among images stored in the seed queue. The selection method in this case may be one of a random selection method, a probabilistic random selection method, and a recent image-prioritized selection method.

According to an embodiment, the deep learning model may be an artificial neural network model trained to generate a specific prediction result for an input image using a deep learning technology. In this case, the artificial neural network may include, for example, a feedforward neural network (FNN), a convolutional neural network (CNN), a recurrent neural network (RNN), etc., but is not necessarily limited to a specific artificial neural network structure.

Meanwhile, according to an embodiment, the converter 110 may generate an input image by applying at least one of one or more preset conversion techniques to the original image in order to generate an adversarial example that maintains semantic preservation for the original image.

In this case, the adversarial example that maintains semantic preservation for the original image is an image converted from the original image, and refers to the image for causing misclassification of the deep learning model by being classified into the same class as the original image when judged by the human eye, but causing the deep learning model to classify it into a different class from the original image.

Specifically, according to an embodiment, one or more preset conversion techniques may include at least one of a noise technique, a blur technique, a spread technique, and a quantization technique.

The noise technique may refer to a conversion technique that generates an adversarial example for the original image by adding preset noise to the original image.

The blur technique may refer to a conversion technique that generates an adversarial example of the original image by transforming the original image to be blurred or hazy through blur processing.

The spread technique may refer to a conversion technique that generates an adversarial example for the original image by adjusting the upper and lower or left and right widths of the original image.

The quantization technique may refer to a conversion technique that generates an adversarial example for the original image by quantizing the original image.

Meanwhile, the conversion techniques for generating the adversarial example of the original image are not necessarily limited to the examples described above, and in addition to the examples described above, various known conversion techniques capable of converting the original image while maintaining semantic preservation of the original image may be included.

The measurer 120 measures neuron coverage of the deep learning model by inputting the input image into the deep learning model.

In this case, according to an embodiment, the measurer 120 may measure the neuron coverage based on an output value for an input image of each of a plurality of neurons included in the deep learning model.

For example, the measurer 120 may measure the neuron coverage using logit, which is an output value for an input image of each neuron included in the deep learning model.

Specifically, according to an embodiment, the measurer 120 may measure the neuron coverage based on the sum of output values of each of a plurality of neurons.

According to another embodiment, the measurer 120 may measure the neuron coverage based on the number of neurons of which output value for an input image exceeds a preset threshold among a plurality of neurons.

Meanwhile, according to an embodiment, when the neuron coverage of the deep learning model measured for the input image satisfies a preset criterion, the measurer 120 may add the corresponding input image to the seed queue. In this case, the converter 110 may additionally convert the input image added to the seed queue and then use the converted image as an input image of the deep learning model.

For example, when the converter 110 selects an image from the seed queue to generate an (n+1)-th input image again after measuring the neuron coverage of the deep learning model using the input image generated through the n-th conversion process, the converter 110 may preferentially select the image showing the highest coverage at the n-th conversion process.

The inspector 130 detects an error in the prediction result based on the prediction result of the deep learning model for the class of the input image and the class of the original image.

According to an embodiment, when the converter 110 generates an input image, that is, when an attack is applied to the deep learning model using fuzzing, the inspector 130 may determine the vulnerability of the deep learning model according to whether or not the attack succeeds.

Meanwhile, since there are various types of vulnerabilities in deep learning models, it is necessary to specify exactly what types of vulnerabilities they are. To this end, according to an embodiment, by using a property-based error classification method, which is a method of detecting a vulnerability using a property that can distinguish between normal and error, the inspector 130 can make it possible to classify what kind of vulnerabilities the corresponding deep learning model has when an error is detected in the prediction result of the deep learning model for the input image.

Specifically, the property-based error classification method may be performed through property-based testing.

In this case, property-based testing refers to a technique that states whether or not the deep learning model operates normally for any input. The process of finding a failure case of the deep learning model is essential for designing or maintaining the normal operation of the deep learning model. However, an existing testing technique has a limitation in not being able to identify an error because even if a test is performed on the deep learning model to identify the failure case, a defective deep learning model passes the test as it is.

However, in order to overcome these limitations, the property-based testing extracts the properties of the deep learning model and derives all the possibilities of the function, thereby capable of maintaining or changing the deep learning model as or to a model that can output consistent conclusions for the same protocol or condition.

For example, the vulnerability of the deep learning model classified by the inspector 130 may include an adversarial example vulnerability issued by an adversarial example. That is, when the human being still evaluates the classification class between the original image and the input image as the same, but the deep learning model evaluates both differently because a subtle disturbing signal (perturbation) at a level, that is almost imperceptible to the human eye, is added to the original image, the inspector 130 may identify that this error is caused by the adversarial example vulnerability.

As another example, the vulnerability of the deep learning model classified by the inspector 130 may include a Not a Number (NaN) vulnerability that invalidates a learned loss rate by making a loss function graph of the deep learning model out of a normal range. Specifically, when the original image is excessively converted, the deep learning model may output Not a Number (NAN) or an infinite value as a predicted value, and in this case, the inspector 130 may determine that this error is caused by the NAN vulnerability.

As still another example, the vulnerability of the deep learning model classified by the inspector 130 may include a quantization vulnerability caused by quantization. Quantization is a technology that reduces an amount of information for reasons of resources, and can be said to be a technology that reduces the model and input data when moving the model to a constrained environment such as an IoT device. Even if quantization processing is performed on the original image, the deep learning model can evaluate the classification class for the image before and after the quantization processing as the same. However, such an error may occur because an unexpected error occurs in the process of quantization due to overfitting of the model and modulation of the input data. Therefore, when there is a classification class difference between the original image and the converted input image and the classification class difference between the quantized image and the converted input image, the inspector 130 may determine that an error caused by a quantization vulnerability is included in a value output from the deep learning model.

Figure 2:
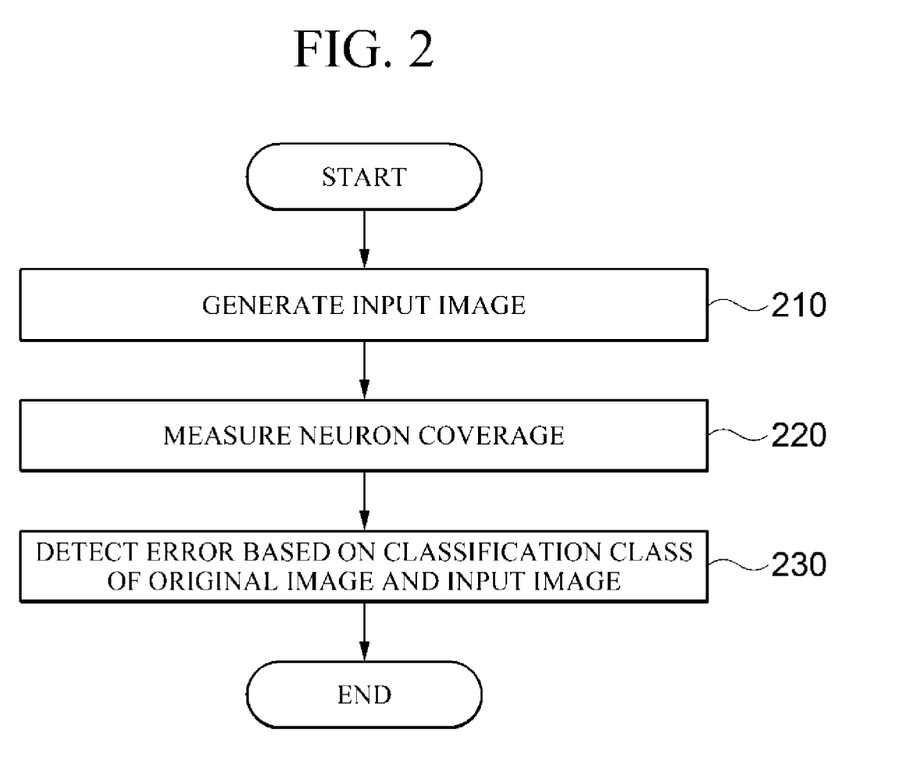
FIG. 2 is a flow chart for describing a method for determining a vulnerability according to an embodiment.

FIG. 2 is a flowchart illustrating a method of determining a vulnerability of a deep learning model according to an embodiment.

The method illustrated in FIG. 2 may be performed by the apparatus 100 for determining the vulnerability illustrated in FIG. 1.

In the illustrated embodiments, the method is described by being divided into a plurality of steps, but at least some of the steps may be performed in a different order, performed together in combination with other steps, omitted, performed by being divided into sub-steps, or performed by being added with one or more steps (not illustrated).

Referring to FIG. 2, first, the apparatus 100 for determining the vulnerability generates an input image for the deep learning model by converting an original image selected from an image dataset (210).

In this case, the apparatus 100 for determining the vulnerability may generate the input image by converting the original image using at least one of a noise technique, a blur technique, a spread technique, and a quantization technique.

After that, the apparatus 100 for determining the vulnerability measures neuron coverage of the deep learning model by inputting the input image into the deep learning model (220).

In this case, according to an embodiment, the apparatus 100 for determining the vulnerability may measure the neuron coverage based on an output value for an input image of each of a plurality of neurons included in the deep learning model.

Specifically, according to an embodiment, the apparatus 100 for determining the vulnerability may measure the neuron coverage based on the sum of output values of each of the plurality of neurons.

According to another embodiment, the apparatus 100 for determining the vulnerability may measure the neuron coverage based on the number of neurons of which an output value for the input image exceeds a preset threshold among a plurality of neurons.

After that, the apparatus 100 for determining the vulnerability detects an error in the prediction result based on a prediction result of the deep learning model for the class of the input image and the class of the original image (230).

In this case, according to an embodiment, the apparatus 100 for determining the vulnerability may detect an error based on whether or not the class of the original image matches the prediction result.

Meanwhile, in the flowchart illustrated in FIG. 2, the method is described by being divided into a plurality of steps, but at least some of the steps may be performed in a different order, performed together in combination with other steps, omitted, performed by being divided into sub-steps, or performed by being added with one or more steps (not illustrated).

Figure 3:
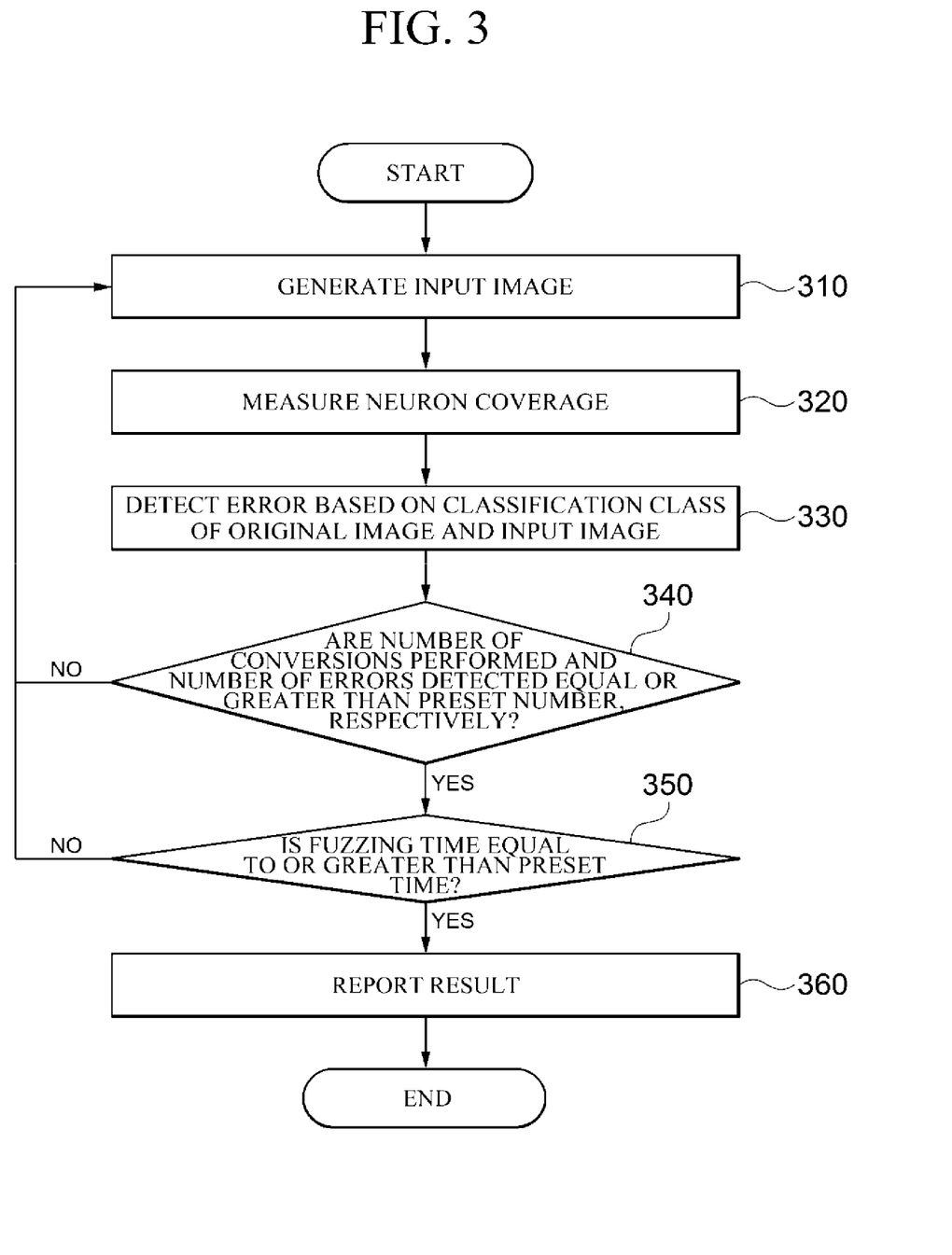
FIG. 3 is a flow chart illustrating an operation process of the method for determining the vulnerability according to the embodiment.

FIG. 3 is a flowchart illustrating an operation process of a method for determining a vulnerability according to an embodiment.

The method illustrated in FIG. 3 may be performed by the apparatus 100 for determining the vulnerability illustrated in FIG. 1.

Meanwhile, in the embodiments, the method is described by being divided into a plurality of steps, but at least some of the steps may be performed in a different order, performed together in combination with other steps, omitted, performed by being divided into sub-steps, or performed by being added with one or more steps (not illustrated).

Referring to FIG. 3, the apparatus 100 for determining the vulnerability generates an input image for a deep learning model by transforming an image selected from a seed queue (310).

After that, the apparatus 100 for determining the vulnerability measures neuron coverage of the deep learning model by inputting the generated input image to the deep learning model (320).

After that, the apparatus 100 for determining the vulnerability detects an error in the is deep learning model based on the prediction result of the deep learning model for the input image (330).

After that, the apparatus 100 for determining the vulnerability determines whether or not the number of conversions to the input image is greater than or equal to a preset number of times, and whether or not the number of errors of the deep learning model detected so far is greater than or equal to a preset number (340).

In this case, when the number of conversions for the input image is less than or equal to the preset number of times, or when the number of errors in the deep learning model detected so far is less than or equal to the preset number, steps 310 to 330 are performed again.

On the other hand, when the number of conversions for the input image is greater than the preset number of times and the number of errors in the deep learning model detected so far is greater than the preset number, the apparatus 100 for determining the vulnerability determines whether or not the fuzzing time is greater than or equal to a preset time (350). When the fuzzing time is less than the preset time, steps 310 to 340 are performed again.

In this time, the fuzzing time may mean a time taken while repeatedly performing steps 310 to 350.

Meanwhile, in the flowchart illustrated in FIG. 3, the method is described by being divided into a plurality of steps, but at least some of the steps are performed in a different order, performed together in combination with other steps, omitted, or performed by being divided into sub-steps, or performed by being added with one or more steps (not illustrated).

Figure 4:
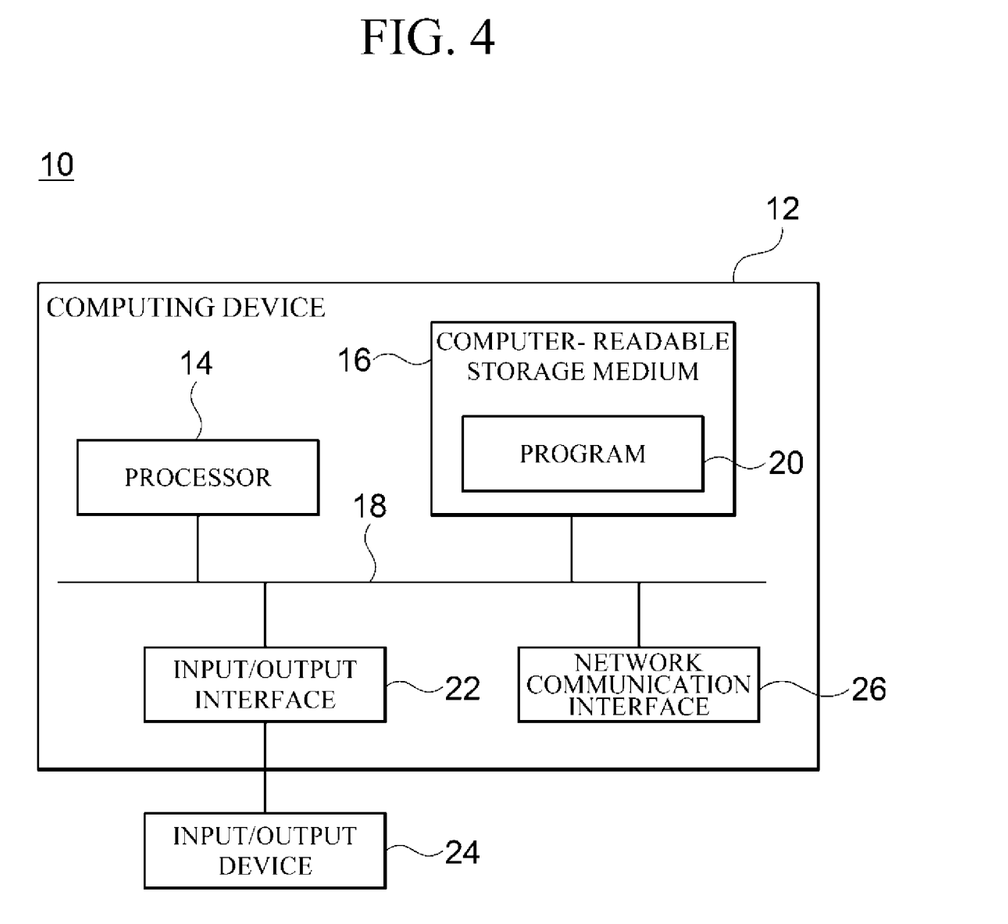
FIG. 4 is a block diagram illustratively describing a computing environment including a computing device according to an embodiment.

FIG. 4 is a block diagram for illustratively describing a computing environment that includes a computing device according to an embodiment. In the illustrated embodiment, each component may have different functions and capabilities in addition to those described below, and additional components may be included in addition to those described below.

The illustrated computing environment 10 includes a computing device 12. In one embodiment, the computing device 12 may be one or more components included in the apparatus 100 for determining the vulnerability illustrated in FIG. 1.

The computing device 12 includes at least one processor 14, a computer-readable storage medium 16 and a communication bus 18. The processor 14 may cause the computing device 12 to operate according to the exemplary embodiment described above. For example, the processor 14 may execute one or more programs stored on the computer-readable storage medium 16. The one or more programs may include one or more computer-executable instructions, which, when executed by the processor 14, may be configured to cause the computing device 12 to perform operations according to the exemplary embodiment.

The computer-readable storage medium 16 is configured to store the computer-executable instruction or program code, program data, and/or other suitable forms of information. A program 20 stored in the computer-readable storage medium 16 includes a set of instructions executable by the processor 14. In one embodiment, the computer-readable storage medium 16 may be a memory (volatile memory such as a random access memory, non-volatile memory, or any suitable combination thereof), one or more magnetic disk storage devices, optical disk storage devices, flash memory devices, other types of storage media that are accessible by the computing device 12 and capable of storing desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or trackpad), a keyboard, a touch input device (such as a touch pad or touch screen), a voice or sound input device, input devices such as various types of sensor devices and/or photographing devices, and/or output devices such as a display device, a printer, a speaker, and/or a network card. The exemplary input/output device 24 may be included inside the computing device 12 as a component constituting the computing device 12, or may be connected to the computing device 12 as a separate device distinct from the computing device 12.

Although the present invention has been described in detail through representative examples above, those skilled in the art to which the present invention pertains will understand that various modifications may be made thereto within the limits that do not depart from the scope of the present invention. Therefore, the scope of rights of the present invention should not be limited to the described embodiments, but should be defined not only by claims set forth below but also by equivalents of the claims.

What is claimed is:

1. An apparatus for determining vulnerability of a deep learning model, the apparatus comprising:
   a converter configured to generate an input image for the deep learning model by transforming an original image selected from an image dataset;
   a measurer configured to measure neuron coverage of the deep learning model by inputting the input image into the deep learning model; and
   an inspector configured to detect, based on a prediction result of the deep learning model for a class of the input image and a class of the original image, an error in the prediction result.

2. The apparatus of claim 1, wherein the converter is further configured to generate the input image by applying at least one of one or more preset conversion techniques to the original image in order to generate an adversarial example that maintains semantic preservation of the original image.

3. The apparatus of claim 1, wherein the measurer is further configured to measure the neuron coverage based on an output value for the input image of each of a plurality of neurons included in the deep learning model for the input image.

4. The apparatus of claim 3, wherein the measurer is further configured to measure the neuron coverage based on a sum of output values for the input image of each of the plurality of neurons.

5. The apparatus of claim 3, wherein the measurer is further configured to measure the neuron coverage based on a number of neurons whose output value for the input image exceeds a preset threshold among the plurality of neurons.

6. The apparatus of claim 1, wherein the inspector is further configured to detect the error based on whether or not the class of the original image matches the prediction result.

7. A method for determining vulnerability of a deep learning model, the method comprising:
generating an input image for the deep learning model by transforming an original image selected from an image dataset;
measuring neuron coverage of the deep learning model by inputting the input image into the deep learning model; and
detecting based on a prediction result of the deep learning model for a class of the input image and a class of the original image, an error in the prediction result.

8. The method of claim 7, wherein, the generating of the input image comprises generating the input image by applying at least one of one or more preset conversion techniques to the original image in order to generate an adversarial example that maintains semantic preservation of the original image.

9. The method of claim 7, wherein, the measuring of the neuron coverage comprises measuring the neuron coverage based on an output value for the input image of each of a plurality of neurons included in the deep learning model for the input image.

10. The method of claim 9, wherein, the measuring of the neuron coverage comprises measuring the neuron coverage based on a sum of output values for the input image of each of the plurality of neurons.

11. The method of claim 9, wherein, the measuring of the neuron coverage comprises measuring the neuron coverage based on a number of neurons whose output value for the input image exceeds a preset threshold among the plurality of neurons.

12. The method of claim 7, wherein, the detecting of the error comprises detecting the error based on whether or not the class of the original image matches the prediction result.

\* \* \* \* \*